(12) United States Patent
Alihodzic et al.

(10) Patent No.: US 7,545,892 B2
(45) Date of Patent: Jun. 9, 2009

(54) METHOD AND CIRCUIT FOR CONTROLLING THE INPUT SIGNAL FOR A CONTACTLESS TRANSPONDER

(75) Inventors: Admir Alihodzic, Graz (AT); Walter Kargl, Graz (AT); Albert Missoni, Graz (AT)

(73) Assignee: Infineon Technologies AG (DE)

( * ) Notice: Subject to any disclaimer, the term of this patent is extended or adjusted under 35 U.S.C. 154(b) by 422 days.

(21) Appl. No.: 11/064,525

(22) Filed: Feb. 22, 2005

(65) Prior Publication Data

US 2005/0185704 A1    Aug. 25, 2005

Related U.S. Application Data

(63) Continuation of application No. PCT/DE03/02599, filed on Aug. 1, 2003.

(30) Foreign Application Priority Data

Aug. 22, 2002  (DE)  ................ 102 38 592
Nov. 5, 2002   (DE)  ................ 102 51 459

(51) Int. Cl.
  *H04L 27/08*  (2006.01)
  *H04L 27/06*  (2006.01)
(52) U.S. Cl. .................. 375/345; 375/317; 375/320
(58) Field of Classification Search ............ 375/268, 375/320, 345
See application file for complete search history.

(56) References Cited

U.S. PATENT DOCUMENTS

| | | | |
|---|---|---|---|
| 5,081,653 A | 1/1992 | Saito | |
| 5,852,535 A * | 12/1998 | Richardson et al. | 360/77.12 |
| 5,864,591 A * | 1/1999 | Holcombe | 375/345 |
| 6,031,419 A | 2/2000 | Roberts et al. | |
| 2002/0047732 A1* | 4/2002 | Akahori | 327/93 |

FOREIGN PATENT DOCUMENTS

| | | |
|---|---|---|
| EP | 0 398 943 B1 | 12/1995 |
| JP | 64-47134 | 3/1989 |
| JP | 2003-125012 | 4/2003 |
| WO | WO-00/28708 A1 | 5/2000 |
| WO | WO-01/71997 A1 | 9/2001 |
| WO | WO-02/082634 A2 | 10/2002 |

* cited by examiner

*Primary Examiner*—Shuwang Liu
*Assistant Examiner*—David Huang
(74) *Attorney, Agent, or Firm*—Dickstein, Shapiro, LLP.

(57) ABSTRACT

Method for controlling an input signal for a contactless transponder, in which a signal strength of an amplitude-modulated input signal is controlled to a nominal value, and identification of a modulation gap by a demodulation device involves control for a controller gain at the time before the modulation gap being stipulated, and identification of the end of the modulation gap involves the control being released after a predetermined interval.

6 Claims, 2 Drawing Sheets

METHOD AND CIRCUIT FOR CONTROLLING THE INPUT SIGNAL FOR A CONTACTLESS TRANSPONDER

CROSS-REFERENCE TO RELATED APPLICATION

This application is a continuation of International Patent application Ser. No. PCT/DE2003/002599, filed Aug. 1, 2003, which published in German on Oct. 17, 2002 as WO 02/082634, and is incorporated herein by reference in its entirety.

FIELD OF THE INVENTION

The invention relates to a method for controlling the input signal for a contactless transponder.

BACKGROUND OF THE INVENTION

The contactless transponder, as used for contactless chip cards or contactless tags, for example, frequently involves the use of "ASK modulation". This is understood to be a radio-frequency signal which, with data present in digital form, alternates between a first and a second level and is thus modulated.

In the same way as the distinction is drawn for digital data between "yes" and "no" or "1" and "0" or "high" and "low", a distinction is drawn between a high and a low amplitude. Two different types of modulation are currently in common use, namely ASK 100 and ASK 10. ASK 100 has a level difference of 100% and ASK 10 has a level difference of 10%.

One problem of ASK modulation can be seen in that a change in the distance between transmitter and receiver of the signal modulated in this manner also results in a change in the received amplitude at the receiver end while the amplitude of the transmitted signal remains the same. The same applies if the medium changes in the intermediate space between transmitter and receiver. To get around this problem, a "shunt controller" is used at the receiver end, as specified in EP 0398943 B1, and is used to control the input signal amplitude upstream of the demodulator.

A drawback of the arrangement described in this EP publication is that the presence of a signal pause, for example following a change from "high" to "low", prompts such a controller to attempt to correct the level difference produced by the information which is to be transmitted. To get around this, the starting point already taken, at least within the company, is for identification of a signal change from "high" to "low" to be followed by a controller gain being frozen to a value before the signal change. As soon as another signal change back from "low" to "high" is identified, the freezing of the controller gain is lifted and the controller continues to operate without restriction.

This measure in turn has the drawback that, at the end of a "low"/"high" change, the controller gain is raised until the high amplitude has been reached. As soon as the high amplitude has been reached, the controller gain is lowered again. However, such a measure easily results in a control overshoot. Such an overshoot can in turn result in the demodulator identifying a state change, i.e. a signal change from "high" to "low", which is in turn not actually present. Such identification of a signal change would ultimately result in incorrect data.

SUMMARY OF THE INVENTION

The invention is therefore based on an object of providing a method for controlling the input signal for contactless transponders in which there is a high degree of reliability in the input signal being controlled such that the signal can be detected with a high degree of reliability.

The fact that identification of the end of a modulation gap is followed by the control "frozen" in the modulation gap not being released until after a prescribed interval ensures that the control starts controlling using the reference variable of the high amplitude as "actual value".

DETAILED DESCRIPTION OF PREFERRED EMBODIMENTS OF THE INVENTION

Figure 1:
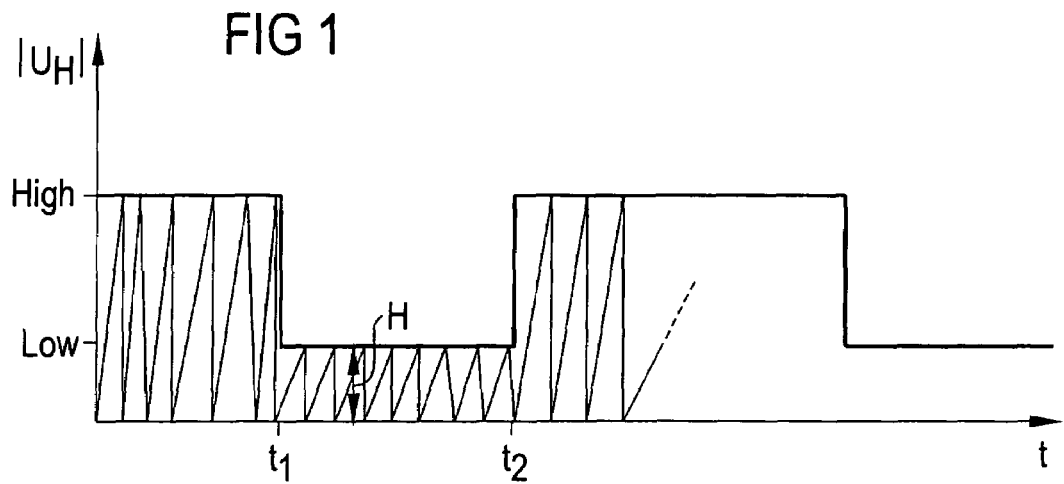
FIG. 1 shows a typical input signal.

FIG. 1 shows, symbolically, a radio-frequency input signal, shown in terms of magnitude, which has been "ASK"-modulated. This is a radio-frequency input signal with the amplitude "high" which is modulated to a lower amplitude value "low" between times $t_1$ and $t_2$. The period between times $t_1$ and $t_2$, in which the amplitude has the low amplitude value "low", is also called the modulation gap.

Figure 2:
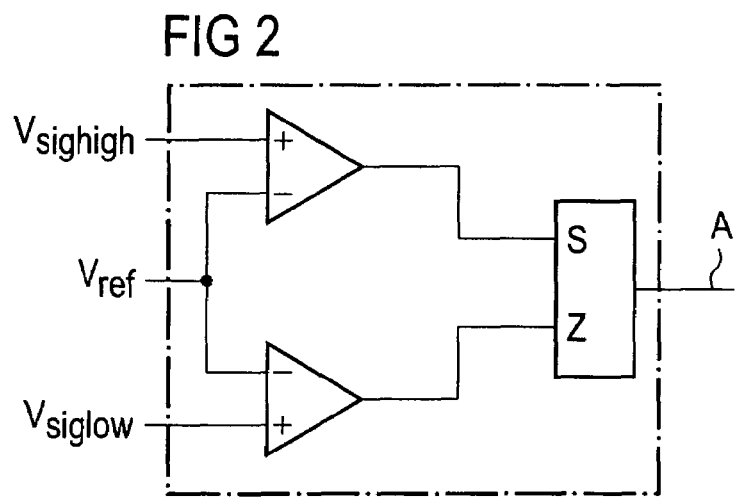
FIG. 2 shows a window detector.
Figure 3:
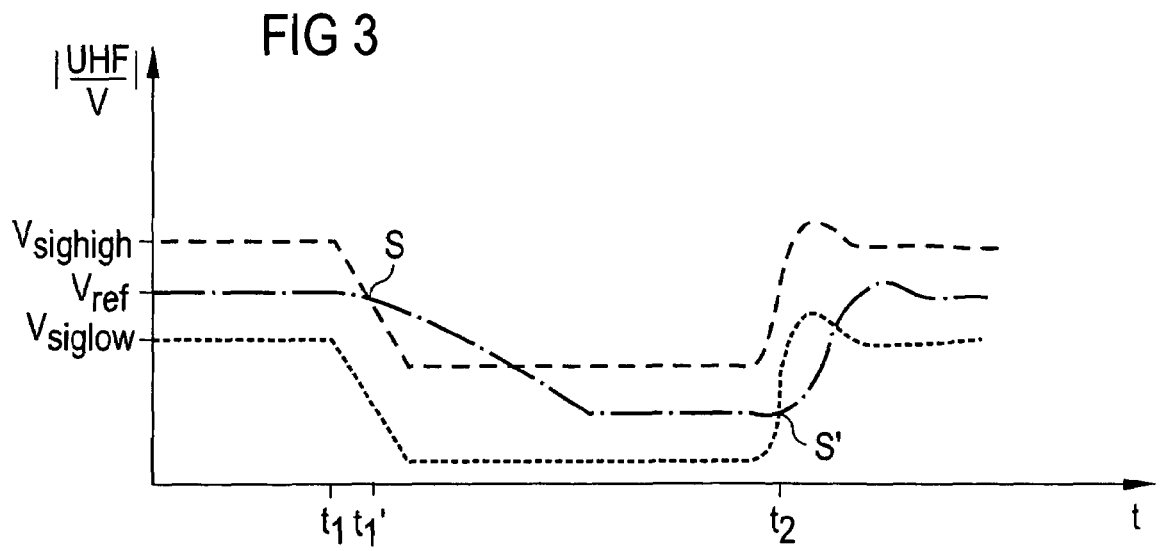
FIG. 3 shows a typical signal profile which is to be detected.
Figure 4:
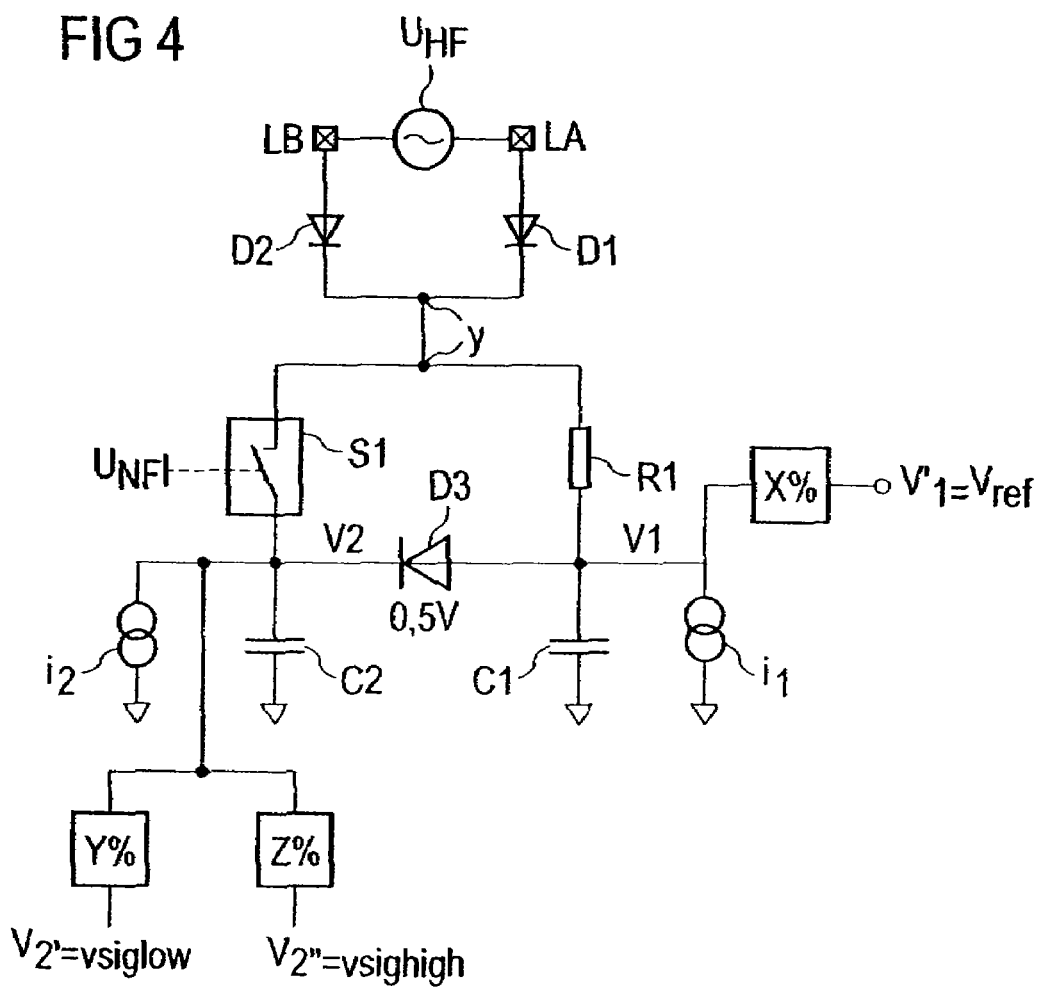
FIG. 4 shows an ordinary detection circuit.

In line with a circuit arrangement as shown in FIG. 4, the radio-frequency signal is detected. This involves the two capacitors C1 and C2 being charged while the signal has the amplitude "high". When the amplitude falls to the value "low", the switch S1 opens and the capacitors C1 and C2 are discharged via the respectively associated current sources $i_1$ and $i_2$, different time constants having been provided. From the voltage profile of the capacitor C1, the reference voltage $V_{ref}$ is obtained, the decision variables being derived from the voltage profile across the capacitor C2 as signals $V_{siglow}$ and $V_{sighigh}$ using different voltage dividers. These signals are supplied to a window circuit, which is shown in FIG. 2. The operation of this window circuit is explained below with reference to the curve profile shown in FIG. 3.

As already explained with reference to FIG. 1, there is a signal change from the high potential to the low potential at time $t_1$. As a result of a suitable choice for the voltage dividers, the signal $V_{sighigh}$ is above the reference variable $V_{ref}$ and the signal $V_{siglow}$ is below the reference variable $V_{ref}$. Different time constants mean that the curve for the signal $V_{sighigh}$ now intersects the curve for the reference variable Vref at time $t_1'$, which is denoted by the intersection S. This intersection S is indicated as the presence of the low amplitude at the output A of the window circuit, which is shown in FIG. 2. Accordingly, the change from the low amplitude to the high amplitude at time t.sub.2 results in an intersection S' between the signal $V_{siglow}$ and the reference variable $V_{ref}$. This is likewise indicated by virtue of the high amplitude state being signaled at the output A.

Figure 5:
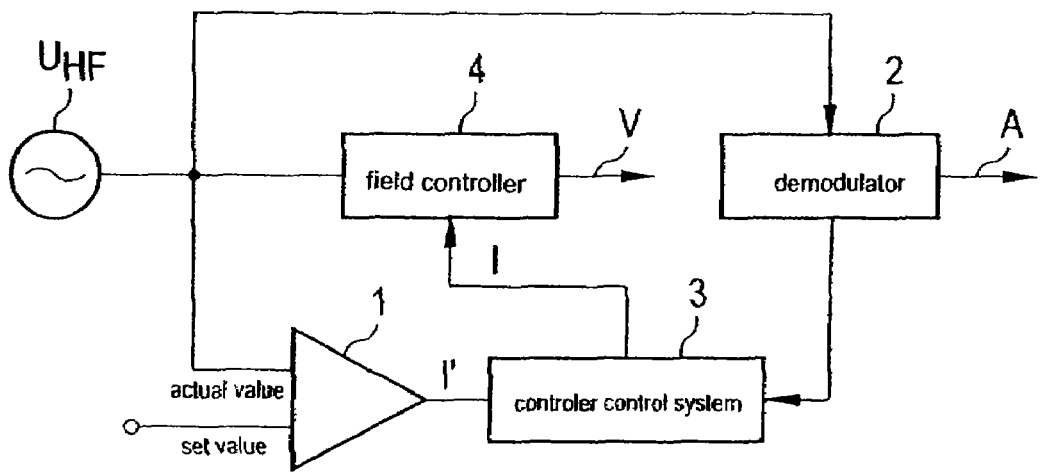
FIG. 5 shows a controller circuit.

So that the demodulator circuit shown in FIG. 4 (which is connected upstream of the window circuit shown in FIG. 2) operates correctly, the supply voltage V for the circuit arrangement is controlled using the control circuit shown in FIG. 5. The voltage or field controller 4 delivers a supply voltage V which has been stipulated at a prescribed value and which is used to operate the rest of the circuit arrangement. The value of the controlled variable I' produced by the input controller 1 is used by a controller control system 3 as controlled variable I for the field controller 4 in relation to the prescribed nominal variable and on the basis of what modulation level has been ascertained by the demodulator 2. If the demodulator 2 identifies a modulation gap, then the controller control system 3 continues to supply the input signal I existing before the demodulation gap to the field controller 4, regardless of the value of the output variable I' from the input controller 1. At the end of the demodulation gap, the controller control system 3 forwards the output variable I' from the input controller 1 to the field controller 4 as input signal I only after a time period has elapsed, if it is assumed that the modulation has reached the value "high".

If the controller gain were to be released at the point S', that is to say when the change from the low amplitude to the high amplitude is identified, this would at least result in a backswing in the curve profiles for $V_{sighigh}$ and $V_{siglow}$. As a result of the low amplitude value, the controller would increase the controller gain, so that the voltage across the connections LA and LB or on the node y would be increased. However, this would result in an excess as a result of the continuous rise in the input voltage on account of a necessary low control time constant. The controller would then reduce the gain, so that a backswing would result. This would in turn result in an intersection between the curve $V_{sighigh}$ and the slowly rising curve for the signal $V_{ref}$. Such an intersection would be identified at the demodulator output as a change from the high amplitude to the low amplitude, which is not actually taking place.

For this reason, the controller control system 3 locks the controller gain beyond the point S' and does not release it until a later time. This time interval needs to be positioned far enough for it to be assumed that the input amplitude has risen sufficiently. However, the controller gain can be locked beyond the point S' only until the controller has been released before a possible new change from the high-amplitude to the low amplitude.

This time interval is therefore dependent on the minimal period of the modulating signal. In one embodiment, the interval is shorter than a minimum distance between two modulation gaps.

What is claimed is:

1. A method for controlling an input signal for a contactless transponder, comprising:
    controlling a signal strength of an amplitude-modulated input signal to a nominal value before a modulating gap;
    identifying the modulation gap and an end of the modulation gap using a demodulation device; and
    controlling a controller gain to a constant value at a time before the modulation gap and releasing control after a predetermined interval following the end of the modulation gap,
    wherein the predetermined interval lasts until the amplitude of the input signal has risen to the nominal value before the modulation gap.

2. The method as claimed in claim 1, wherein the predetermined interval is shorter than a minimum distance between two modulation gaps.

3. A controller circuit for controlling an input signal for a contactless transponder, comprising:
    controlling means for controlling a signal strength of an amplitude-modulated input signal to a nominal value before a modulation gap;
    demodulation means for identifying the modulation gap and an end of the modulation gap; and
    gain controller means for controlling a gain to a constant value at a time before the modulation gap and releasing control after a predetermined interval following the end of the modulation gaps,
    wherein the predetermined interval lasts until the amplitude of the input signal has risen to the nominal value before the modulation gap.

4. The controller circuit as claimed in claim 3, wherein the predetermined interval is shorter than a minimum distance between two modulation gaps.

5. A controller circuit for controlling an input signal for a contactless transponder, comprising:
    a field controller that receives an amplitude-modulated input signal and outputs a supply voltage;
    an input controller that receives the amplitude-modulated input signal and outputs a control signal;
    a demodulator that identifies a modulation gap and an end of the modulation gap in the amplitude-modulated input signal; and
    a controller control system that outputs the control signal output by the input controller to the field controller,
    wherein the controller control system continues to output the control signal existing before the identification of the modulation gap, until after a predetermined time period has elapsed following the end of the demodulation gap, and
    wherein the predetermined interval lasts until the amplitude of the input signal has risen to a nominal value before the modulation gap.

6. The controller circuit as claimed in claim 5, wherein the predetermined interval is shorter than a minimum distance between two modulation gaps.

\* \* \* \* \*

UNITED STATES PATENT AND TRADEMARK OFFICE
CERTIFICATE OF CORRECTION

PATENT NO. : 7,545,892 B2
APPLICATION NO. : 11/064525
DATED : June 9, 2009
INVENTOR(S) : Admir Alihodzic et al.

It is certified that error appears in the above-identified patent and that said Letters Patent is hereby corrected as shown below:

In the Specification:

Col. 3, line 38, delete "high-amplitude" and insert -- high amplitude --, therefor.

In the Claims:

In Claim 1, Col. 3, line 49, delete "modulating" and insert -- modulation --, therefor.

In Claim 3, Col. 4, line 21, delete "gaps," and insert -- gap, --, therefor.

Signed and Sealed this

Eighteenth Day of August, 2009

David J. Kappos
*Director of the United States Patent and Trademark Office*